Dec. 26, 1961  J. C. TRAVILLA ET AL  3,014,435
SIX-WHEEL MOTOR TRUCK
Filed Feb. 23, 1960  2 Sheets-Sheet 1

INVENTORS:
JAMES C. TRAVILLA
JULIUS J. ZACH
BY Francis T. Burgess
ATTORNEY.

Dec. 26, 1961   J. C. TRAVILLA ET AL   3,014,435
SIX-WHEEL MOTOR TRUCK
Filed Feb. 23, 1960   2 Sheets-Sheet 2

INVENTORS:
JAMES C. TRAVILLA
JULIUS J. ZACH
BY Francis A. Burgess
ATTORNEY.

United States Patent Office 3,014,435
Patented Dec. 26, 1961

3,014,435
SIX-WHEEL MOTOR TRUCK
James C. Travilla, Ladue, and Julius J. Zach, St. Louis, Mo., assignors to General Steel Industries, Inc., a corporation of Delaware
Filed Feb. 23, 1960, Ser. No. 10,345
7 Claims. (Cl. 105—190)

The invention relates to railway rolling stock and consists particularly in a six-wheel three-motor truck for diesel electric or straight electric narrow-gauge locomotives.

Because of the relatively light load capacity of much narrow gauge trackage, it has been found that the optimum number of axles per swivel truck is three, all of which must be motorized if maximum power is desired. Because such narrow gauge lines are frequently built with very short radius curves, the truck wheel base must be kept to a minimum consistent with the provision of three motors per truck. If high speed operation is required, it is desirable both for the protection of locomotive operating personnel and to prevent damage to the equipment carried in the cab, that means be provided for reducing the transmission of lateral shocks from the track structure through the truck to the locomotive cab or body. A simple and highly effective way to prevent the transmission of lateral shocks to the body is to support the body on a swing-motion bolster rather than supporting it directly on the truck frame. The use of a swing-motion bolster suspended in the usual way, however, is not permitted in a short wheel base narrow gauge three motor truck because substantially the entire space between the truck side members throughout the full length of the truck is occupied by wheels, motors, brake hanger brackets and brake rigging.

It is accordingly a main object of the invention to provide a six-wheel, three-motor, short wheel-base, swing-motion truck adaptable for narrow gauge service.

A further object is to provide a truck in which the bolster is sufficiently high to clear the middle axle motor and is arranged to permit easy access to the motor for maintenance purposes.

It is a further object to provide a truck in which the bolster extends over the truck frame side members and is supported therefrom by swing hangers carried by brackets extending outwardly from the truck frame side members.

It is a further object to provide a bolster construction of the type referred to above in which the bolster can be disassembled from the truck frame when desired, even though portions of the bolster underlie the outside swing hanger brackets.

The foregoing and additional objects and advantages will be evident from the detailed description which follows, in connection with the drawings in which.

Figure 1:
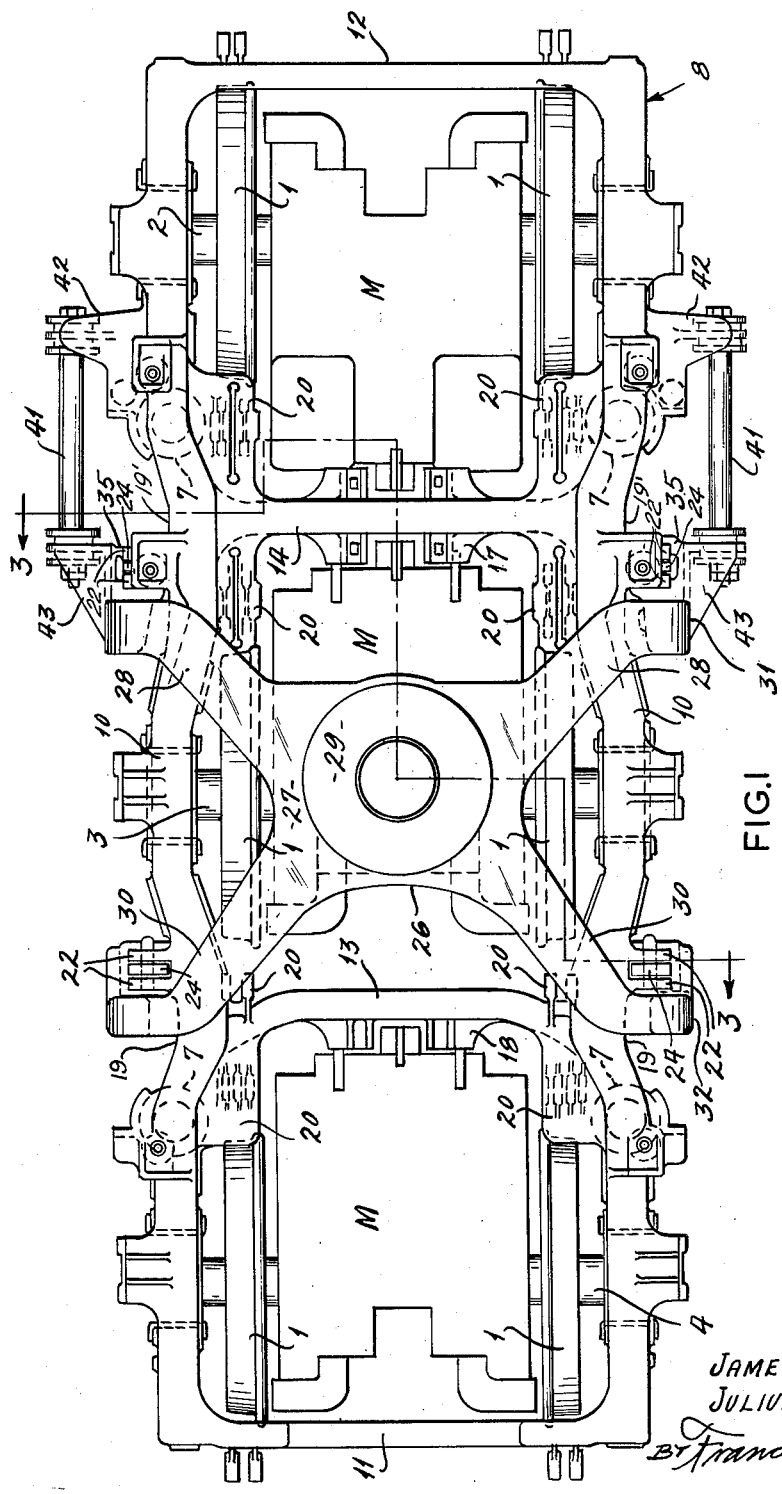
FIGURE 1 is a top view of a truck embodying the invention.
Figure 2:
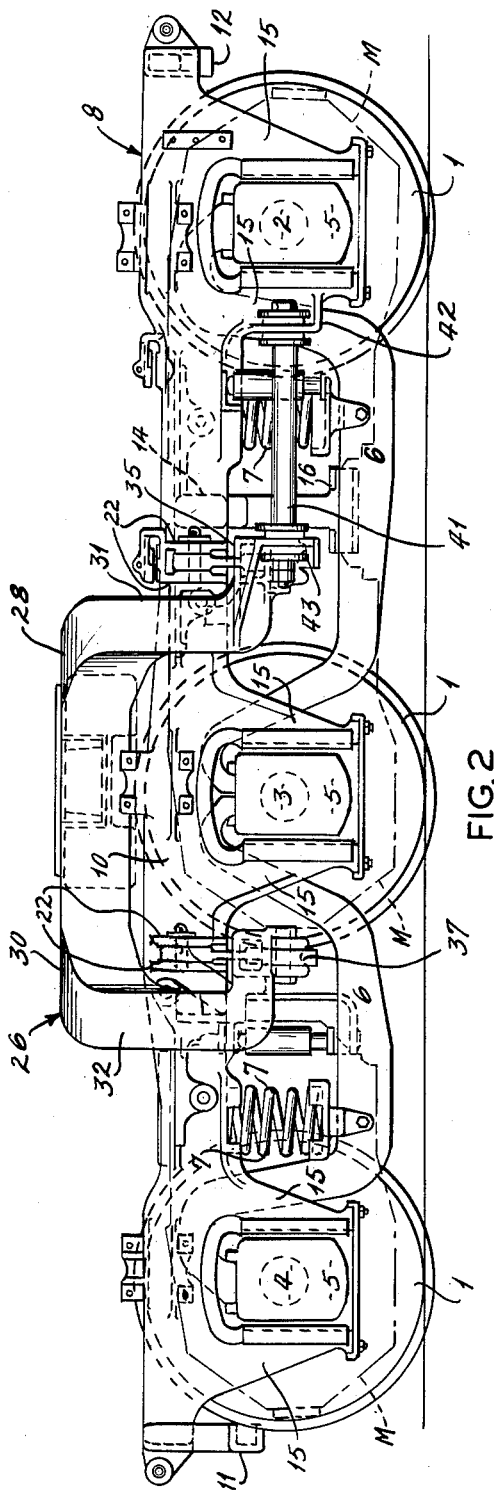
FIGURE 2 is a side view of the truck illustrated in FIGURE 1.
Figure 3:
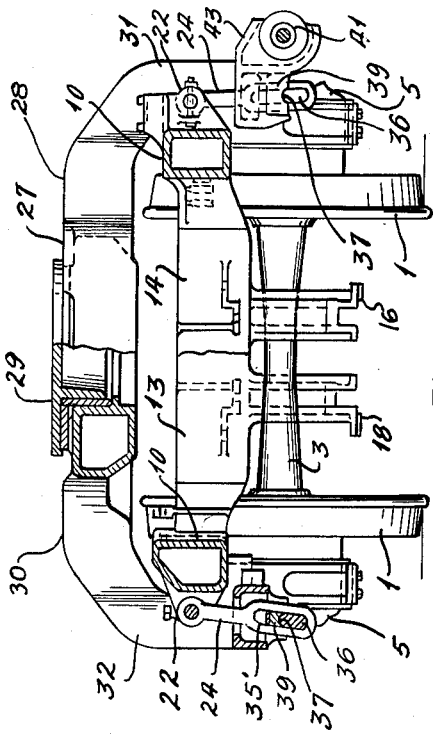
FIGURE 3 is a transverse vertical sectional view along the line 3—3 of FIGURE 1.

Referring now to the drawings, the numerals 1 refer to each of six flanged wheels which are rigidly mounted in pairs, respectively, on axles 2, 3, and 4, on the ends of each of which are rotatably supported journal boxes 5. Adjacent journal boxes 5, at each side, support conventional longitudinally-extending drop equalizers 6, on each of which is mounted an upstanding coil spring 7 near the end axles.

A rigid cast steel truck frame, generally indicated at 8, includes longitudinally-extending box section side members 10 positioned laterally outboard of wheels 1 and connected at their ends by transverse end transoms 11 and 12, and between the middle axle and each end axle by transverse intermediate transoms 13 and 14, respectively.

Side members 10 are formed with depending pedestal jaws 15 embracing the outer extremities of each of the axles 2, 3, and 4, and vertically slidably receiving journal boxes 5, whereby to maintain the axles in fixed parallel relation with each other and the wheels at each side aligned longitudinally of the truck. Intermediate the middle axle and end axle pedestals, frame side members 10 are supported on equalizer springs 7 in well-known manner.

Separate traction motors M and associated gear boxes are journaled on each of the axles 2, 3, and 4, and are resiliently supported from brackets on the adjacent intermediate transom, motor M of axle 2 being supported on bracket 16 of intermediate transom 14, middle axle motor M being supported from a similar but oppositely directed bracket 17 on intermediate transom 14, and end axle 4 motor M being supported on bracket 18 of transom 13. It will be seen from the foregoing that substantially the entire space between the wheels, both transversely and longitudinally of the truck is occupied by motors M and that the very small space at the intersections of the intermediate transoms 13 and 14 and the side members 10 is occupied by brake hanger brackets 20.

Intermediate the adjacent axles and adjacent the intersections of transoms 13 and 14, frame side members 10 are inwardly recessed as at 19 and 19', and longitudinally inwardly of the truck from these intersections, each of the recessed portions 19 and 19' of the side members is formed with an outwardly extending bifurcated bracket comprising spaced ears 22, from each pair of which is pivotally supported, on an axis extending lengthwise of the truck, a depending and slightly outwardly-inclined swing-hanger 24.

A bolster 26 consisting of a central portion 27, including an upwardly facing pivot central bearing 29, overlies middle axle 3 and its associated motor M and is formed with four diagonally extending legs 28, 28 and 30, 30 which extend outwardly over frame side members 10, and outwardly thereof are bent downwardly as at 31 and 32 adjacent the side member recesses 19 and 19', the downwardly extending portions 31 and 32 each being at the same side, longitudinally of the truck, of the two pairs of ears 22 at each side of the truck. Downwardly extending portions 31 and 32 of bolster 26 are formed with horizontally extending feet 34 and 35 which extend in the same direction longitudinally of the truck from their associated downwardly extending portions 31 and 32 and underlying swing hanger ears 22. Feet 34 and 35 are centrally vertically apertured to permit the passage therethrough of hangers 24.

Swing hangers 24 are each formed with the usual axially elongated slot 35 in their lower end portions. A short key 36 upwardly recessed intermediate its ends as at 37 for engagement with the lower end of swing-hanger slot 35, is carried thereby and pivotally supports a short bearing member 39 having an upwardly concave lower surface engageable with and seated on the upper convex surface of key 36. Bearing member 39 is formed with narrow neck intermediate its ends and passing through slot 35 of the swing hanger, the widened end portions of each bearing 39 being seated against the lower surfaces of bolster feet 34, 34 and 35, 35, and thus supporting the bolster on the swing hangers.

Draft and braking forces are transmitted between the truck frame and the bolster by longitudinally-extending bolster anchors 41 of a type well-known in the art, which are connected at their respective ends to brackets 42 on each side of the truck frame and corresponding brackets 43 extending outwardly from each of bolster feet 35, the end connections including flat rubber pads under compression between opposing transverse surfaces of the brackets and the anchor for permitting slight angular movement of the anchors about their axes relative to the associated brackets but resisting any axial movements of the anchors, whereby to accommodate transverse movements of the bolster 26 relative to the truck frame 8 but preventing any relative longitudinal movements therebetween.

The operation of the truck closely resembles that of conventional six-wheel equalized swing-motion motor trucks. Through the equalizers 6, the body load is transmitted in substantially equal proportions to each of the wheels irrespective of irregularities in the track structure, and the body inertia resists tendencies of the body and bolster to move laterally responsive to the imposition of lateral shocks on the wheel flanges by the track structure, necessary lateral movement of the body relative to the truck frame being accommodated and resisted by the swing hangers by which the bolster is supported from the truck frame.

The principal advantage of the present construction lies in the accessibility of the middle axle motor provided by the bolster arrangement and the ease with which the bolster can be separated from the truck frame or reassembled therewith.

For removing the bolster, the bolster anchors are disconnected and the bolster feet 34, 35 are elevated slightly by jacking. Swing hanger bearings 39 are rotated about their axes until aligned with swing hanger slots 39, from which they are then extracted, after which keys 36 are lifted out. The swing hangers are then unpinned from their supporting brackets 22 and removed. After removal of the swing hangers, the bolster is translated lengthwise of the truck until its feet 34, 34 and 35, 35 are vertically disaligned from the swing hanger brackets 22, which permits elevation and removal of the bolster.

The truck may be easily reassembled by performing the same steps in reverse order.

The exclusive use of modifications coming within the scope of the appended claims is contemplated.

What is claimed is:

1. A railway vehicle truck comprising wheel and axle assemblies, a rigid frame supported therefrom and including longitudinally-extending side members, outwardly extending brackets on each of said side members and spaced apart lengthwise thereof, a single hanger pivotally depending from each of said brackets and swingable transversely of said truck, a bolster overlying said frame and having arms extending downwardly outwardly of said side members beside said brackets, each of said arms being disposed in the same direction lengthwise of the truck from the adjacent bracket and having a horizontal portion underlying the adjacent bracket, each of said horizontal portions being supported only by one of said hangers.

2. A railway vehicle truck according to claim 1, having three wheel and axle assemblies and two of said brackets at each side of the truck and disposed at either side of the middle assembly, and said bolster comprises a central portion including load-supporting means overlying said middle assembly, and two transversely outwardly extending arms at each side.

3. A railway vehicle truck according to claim 2 including motors associated with each of said assemblies, said bolster central portion overlying the motor associated with said middle assembly and being positioned at a higher level than said frame side members whereby to vertically clear the top portion of said motor and provide access thereto.

4. A railway vehicle truck according to claim 1 in which the horizontal portion of each bolster arm is vertically apertured to permit the passage therethrough of the associated swing hanger, there being removable structure carried by each said hanger and engageable with the lower surface of each said horizontal portion for supporting said bolster from said hangers.

5. A railway vehicle truck according to claim 2 in which the load-supporting means carried by the central portion of said bolster is a central bearing comprising a centrally disposed upright cylindrical surface and an annular horizontal surface surrounding said cylindrical surface.

6. A railway vehicle truck according to claim 2 including longitudinally-extending anchor means connecting the horizontal portion of a bolster arm at each side of the truck to said frame and transmitting acceleration and retardation forces therebetween, the connections of said anchor means to said bolster and said frame being capable of limited pivotal movement whereby to accommodate relative lateral movements of said bolster and frame permitted by said swing hangers.

7. A railway vehicle truck according to claim 2 in which the side members of said frame are recessed inwardly adjacent the downwardly extending outer portions of said arms whereby to accommodate desired lateral movements of said bolster relative to said frame without excessively increasing the width of the truck.

References Cited in the file of this patent

UNITED STATES PATENTS

| | | |
|---|---|---|
| 2,475,327 | Keller | July 5, 1949 |
| 2,685,262 | Blomberg | Aug. 3, 1954 |
| 2,697,405 | Travilla | Dec. 21, 1954 |